US00RE44655E

(19) United States
(12) Reissued Patent
Ross et al.

(10) Patent Number: US RE44,655 E
(45) Date of Reissued Patent: Dec. 24, 2013

(54) BIAS ASSEMBLY FOR RATCHET TOOLS

(75) Inventors: David T. Ross, Beach Park, IL (US); Steven R. Wente, Kenosha, WI (US)

(73) Assignee: Snap-On Incorporated, Kenosha, WI (US)

(21) Appl. No.: 13/553,441

(22) Filed: Jul. 19, 2012

Related U.S. Patent Documents

Reissue of:
(64) Patent No.: 7,987,747
Issued: Aug. 2, 2011
Appl. No.: 11/784,166
Filed: Apr. 5, 2007

(51) Int. Cl.
*B25B 13/46* (2006.01)

(52) U.S. Cl.
USPC ..... 81/63.1; 81/62

(58) Field of Classification Search
USPC ..... 81/60–63.2
See application file for complete search history.

(56) References Cited

U.S. PATENT DOCUMENTS

| | | | | |
|---|---|---|---|---|
| 581,427 | A | 4/1897 | Olson | |
| 1,101,381 | A | 6/1914 | Anderson et al. | |
| 2,201,827 | A | 5/1940 | Froeschl et al. | |
| 2,521,419 | A * | 9/1950 | Sellers | 81/63.1 |
| 2,981,389 | A | 4/1961 | Kilness | |
| 2,982,161 | A | 5/1961 | Angquist et al. | |
| 3,436,992 | A | 4/1969 | Over et al. | |
| 4,520,697 | A | 6/1985 | Moetteli | |
| 4,934,220 | A | 6/1990 | Slusar et al. | |
| 5,140,875 | A | 8/1992 | Kim | |
| 5,174,176 | A | 12/1992 | Krivec | |
| 5,325,743 | A | 7/1994 | Engel | |
| 5,467,672 | A | 11/1995 | Ashby | |
| 5,884,537 | A | 3/1999 | Chen | |
| 6,125,722 | A | 10/2000 | Hopper, Jr. et al. | |
| 6,305,248 | B1 | 10/2001 | Rowlay | |
| 6,357,323 | B2 | 3/2002 | Chi et al. | |
| 6,584,875 | B1 | 7/2003 | Deng | |
| 6,666,112 | B2 | 12/2003 | Hu | |
| 6,691,594 | B2 | 2/2004 | Chen | |
| 6,857,339 | B2 | 2/2005 | Chen | |
| 6,935,213 | B2 | 8/2005 | Shu-Sul et al. | |
| 6,971,285 | B2 | 12/2005 | Chen | |
| 6,981,434 | B2 | 1/2006 | Chen | |

(Continued)

FOREIGN PATENT DOCUMENTS

| | | |
|---|---|---|
| CA | 2146069 | 10/1996 |
| DE | 202004009126 U1 | 11/2004 |

(Continued)

OTHER PUBLICATIONS

Combined Search and Examination Report dated Mar. 26, 2012, App. No. GB1204516.7 of Applicant.

*Primary Examiner* — Hadi Shakeri
(74) *Attorney, Agent, or Firm* — Seyfarth Shaw LLP

(57) ABSTRACT

A ratcheting tool such as a reversible dual-pawl ratchet wrench is disclosed that minimizes wasted motion during ratchet slip or counter-rotation. The ratchet wrench includes a bias assembly that biases the pawls apart to bias a first, selected pawl for a selected drive direction towards engagement with a ratchet gear, and that the biases the selected pawl into a concentric alignment with the ratchet gear. In this manner, non-ratcheting initial rotation of the pawl due to counter-rotation prior to the pawl camming out of engagement with the ratchet gear is eliminated, thus eliminating wasted motion and maximizing the available angular sweep for the wrench.

41 Claims, 4 Drawing Sheets

(56) References Cited

U.S. PATENT DOCUMENTS

| | | | | |
|---|---|---|---|---|
| 6,988,429 | B2 * | 1/2006 | Lee et al. | 81/63.2 |
| 6,997,084 | B1 | 2/2006 | Gao et al. | |
| 7,062,994 | B2 | 6/2006 | Chen | |
| 7,073,412 | B1 | 7/2006 | Arnold | |
| 7,080,579 | B2 | 7/2006 | Chen | |
| 7,082,859 | B2 | 8/2006 | Huang | |
| 7,082,860 | B2 | 8/2006 | Shu-Sui et al. | |
| 7,089,830 | B2 | 8/2006 | Hu | |
| 7,114,415 | B1 | 10/2006 | Chiang | |
| 7,124,664 | B1 | 10/2006 | Lee | |
| 7,168,342 | B2 | 1/2007 | Gao et al. | |
| 7,299,720 | B1 | 11/2007 | Schultz et al. | |
| 2004/0089109 | A1 | 5/2004 | Chen | |
| 2004/0154439 | A1 | 8/2004 | Tuan-Mu | |
| 2004/0261584 | A1 | 12/2004 | Huang | |
| 2005/0016332 | A1 | 1/2005 | Hu | |
| 2005/0126348 | A1 | 6/2005 | Arnold | |
| 2005/0193870 | A1 | 9/2005 | Chen | |
| 2005/0204868 | A1 | 9/2005 | Liu | |
| 2005/0247167 | A1 | 11/2005 | Chaconas et al. | |
| 2005/0257650 | A1 * | 11/2005 | Hu | 81/63.1 |
| 2005/0262970 | A1 | 12/2005 | Hsien | |
| 2006/0016658 | A1 | 1/2006 | Gauthier | |
| 2006/0048610 | A1 | 3/2006 | Hu | |
| 2006/0065080 | A1 | 3/2006 | Davidson et al. | |
| 2006/0090609 | A1 | 5/2006 | Chang | |
| 2008/0229889 | A1 * | 9/2008 | Hopper et al. | 81/63.1 |

FOREIGN PATENT DOCUMENTS

| | | | |
|---|---|---|---|
| EP | 1484135 | A1 | 12/2004 |
| GB | 2367516 | A | 4/2000 |
| GB | 2367516 | A | 4/2002 |
| GB | 2447765 | A | 9/2008 |
| GB | 2453033 | A | 3/2009 |
| GB | 2460367 | A | 12/2009 |
| WO | WO 2006/033748 | A2 | 3/2006 |

* cited by examiner

BIAS ASSEMBLY FOR RATCHET TOOLS

Matter enclosed in heavy brackets [ ] appears in the original patent but forms no part of this reissue specification; matter printed in italics indicates the additions made by reissue.

FIELD OF THE INVENTION

The invention relates to ratchet pawl assemblies for ratchet tools and, in particular, to a bias assembly for reducing wasted motion for a ratchet tool or wrench.

BACKGROUND

Currently, hand tools utilizing ratchets are well-known. On a basic level, these ratchet tools operate so that rotation or drive in a first direction engages internal components so that the tool operates in the manner a traditional non-ratchet tool would to provide rotational drive to a workpiece such as a screw or a bolt, for instance. When the tool is rotated in a second direction opposite the first direction, the internal components are able to slip or ratchet over each other so that this rotation does not counter-drive the workpiece. Accordingly, a user of the tool can engage the tool with the work piece and maintain the tool engaged thereto while rotating and counter-rotating the tool to drive the workpiece. The user simply rotates the tool in the first direction for a portion of a circular sweep which provides drive, then counter-rotates the tool in the second direction without applying drive, then returns to the first direction to again apply drive force.

As is known, these ratchet tools allow a user to insert the operating or driving end of the tool into a tight space and operate the tool over a short sweep in a quick manner. For instance, a space in an engine compartment of an automobile is tightly packed and arranged. Therefore, access to a bolt may be limited, and a high torque is needed to tighten or loosen the bolt. A wrench used to tighten or loosen the bolt may only be able to rotate a small number of degrees before the path of the wrench brings the wrench into contact or interference with other components mounted in the engine compartment. This means that the tool must be rotated these few degrees many times. It is often awkward and difficult to use a traditional (non-ratcheting) tool in these spaces as such requires making a small turn, and then removing and reengaging the tool with the bolt or other workpiece. Thus, the advantage of a ratcheting tool is that it remains engaged and saves significant time and effort when compared to a traditional, non-ratcheting tool.

A ratcheting tool typically has a ratchet gear, the ratchet gear either cooperating with or being integral with a drive portion for delivering torque drive, and either one or two pawls. The single pawl has two sets of ratchet teeth which are alternately engaged with the ratchet gear. The two pawl device, known as a dual-pawl ratchet, has pawls that are moved into and out of engagement with the ratchet gear and have ratchet teeth that selectively engage with the ratchet gear.

An issue with these ratchet tools is that, once the tool has been counter-rotated, the pawls and their teeth must re-engage with the ratchet gear to provide torque drive. Generally speaking, the pawls are biased into engagement with the ratchet gear. However, in both single and dual-pawl arrangements, the bias member provides bias to the pawl(s) in a single direction. As a result, there is wasted rotational movement in order to dis-engage and re-engage the pawl. In common parlance, one would describe such a wrench as having "play" between a point where the wrench is in a fully engaged, driving position and a point at which the pawl slips or "clicks" over the ratchet gear by a single tooth.

By way of illustration, U.S. Pat. No. 6,691,594, to Chen, discloses a reversible dual-pawl ratchet wrench. When rotated in the drive direction, the engaged pawl is constrained by the wrench head, as well as the ratchet gear. When counter-rotated, the pawl does not immediately disengage so that a tooth of the pawl shifts to an adjacent tooth of the ratchet gear. Instead, the pawl slides along the interior of the wrench head until the pawl moves to a position allowing the pawl to shift radially away from the ratchet gear sufficient to allow the teeth of the gear and pawl to slip or, more precisely, to allow the gear teeth to cam the pawl out of engagement. Until the pawl shifts to such a position, the counter-rotation is wasted movement. When the tool is used in a space that provides little overall rotational sweep, this wasted movement can be significant.

Some ratchet tools provide structures that may limit the rotation of the pawl or pawls. For instance, a pawl may be provided with a spring which biases the pawl into engagement with the gear, and counter-rotation of the gear cams the pawl in a direction that compresses the spring. The pawl itself is positioned against one or more rigid portions formed in the ratchet head, such as a channel For such devices, the pawl may bind with or grind against the channel so that operation of the tool is rendered difficult at times.

Accordingly, there has been a need for an improved arrangement and assembly for a ratcheting tool.

SUMMARY

In accordance with an aspect of the invention, a bias assembly for a reversible ratchet tool is disclosed, the ratchet tool having first and second pawls and a reversing actuator for selecting a drive direction for the ratchet tool by selectively engaging one of the pawls into a ratchet gear. The bias assembly includes a first bias member having a first portion engageable with the first pawl, a second portion engageable with the second pawl, and a third portion engageable with a portion of the ratchet tool, wherein the bias member biases the selected pawl towards the ratchet gear and biases the selectively engaged pawl towards concentric alignment with the ratchet gear. The bias assembly may further include a second bias member positioned between and engaged with the first and second pawls and providing a bias to separate the pawls. Preferably, the first bias member is a leaf spring.

In one form, the first bias member is generally V-shaped, the third portion thereof being an apex of the V-shape, and the apex is generally positioned against a V-shaped surface or structure formed on the ratchet tool. Selection of a drive direction causes the first bias member to pivot on the apex. The first bias member may further include first and second ends, the first and second ends engageable with a portion of the ratchet tool to position the first bias member in the ratchet tool.

In another form, the first bias member is generally arcuate. The first bias member may include first and second ends, the first and second ends respectively including the first and second portions engageable with the first and second pawls. The first and second portions of the first bias member may be cooperable with structural features of the first and pawls to position the first bias member in the ratchet tool.

The first bias member may provide a bias force against the first and second pawls to direct at least the selectively engaged pawl towards the ratchet gear in a radial direction thereof.

In another aspect of the invention, a bias assembly for a reversible ratchet tool is disclosed, the ratchet tool having first and second pawls and a reversing actuator for selecting a drive direction for the ratchet tool by selectively engaging one of the pawls into a ratchet gear. The bias assembly includes a first engagement contact for biasing the first pawl towards the ratchet gear, a second engagement contact for biasing the second pawl towards the ratchet gear, and third and fourth engagement contacts for biasing the first and second pawls apart, wherein the bias assembly biases the selectively engaged pawl towards concentric alignment with the ratchet gear. In some forms, the first and second engagement contacts are formed on a first bias member for providing a bias force against the first and second pawls to direct at least the selectively engaged pawl towards the ratchet gear in a radial direction thereof. In some forms, the third and fourth engagement contacts are formed on a second bias member positioned between the first and second pawls. The first bias member may be a leaf spring. The bias assembly may provide bias to both pawls simultaneously.

In another aspect, a reversible dual-pawl ratchet wrench is disclosed including a ratchet head having walls defining a cavity for receiving components for selecting a drive direction of the ratchet wrench, a ratchet gear at least partially received within the cavity for transmitting torque to a workpiece, first and second pawls selectively engageable with the ratchet gear for the selected drive direction of the ratchet wrench, a bias assembly cooperating with the first and second pawls and with the ratchet head walls to bias at least the selectively engaged pawl into concentric alignment with the ratchet gear, the bias assembly further cooperating with the first and second pawls to bias the pawls apart. The bias assembly may include a first bias member in the form of a leaf spring for biasing the selectively engaged pawl into concentric alignment with the ratchet gear, and a second bias member for biasing the first and second pawls apart. The second bias member may be a coil spring.

The ratchet wrench may include a reversing actuator for selecting the drive direction, the reversing actuator alternately engageable with the pawls for shifting one pawl, wherein the second bias member cooperates with the shifted pawl to shift the other pawl.

The ratchet wrench may include a reversing actuator for selecting the drive direction, the reversing actuator alternately engageable with the pawls to shift one pawl out of engagement with the ratchet gear, the bias assembly biasing the other pawl away from the shifted pawl and into engagement with the ratchet gear. The bias assembly may include a first bias member for biasing the each of the pawls towards concentric alignment with the ratchet gear when the pawls are selected, and the bias member is shifted within the cavity in response to selection of a drive direction. The first bias member may provide a bias force against the first and second pawls to direct at least the selectively engaged pawl towards the ratchet gear in a radial direction thereof.

In a further aspect, a bias assembly for a ratchet tool having a ratchet gear engageable with at least a first ratchet pawl to provide drive in a drive direction and to allow the ratchet pawl to slip relative to the ratchet gear in a slip direction opposite the drive direction is disclosed, the bias assembly including a first portion engageable with the pawl to provide a bias in a first direction, and a second portion engageable with the pawl to provide bias in a second direction, wherein the bias assembly biases the pawl into concentric alignment with the ratchet gear.

As described, a bias assembly is provided that provides a force against an engaged pawl to minimize the amount of counter-rotation necessary for the pawl and a ratchet gear to ratchet or slip relative to each other. Preferably, the bias assembly provides a force against the engaged pawl in a direction along a radius of the ratchet gear. It is also preferred that the bias assembly serves to bias the engaged pawl in a direction opposite the slip direction. This allows the ratchet tool to utilize minimum components for shifting pawls and selecting a drive direction, and allows the bias assembly to advance the pawl in the drive direction when the pawl has been cammed out of engagement with the ratchet gear due to counter-rotation thereof. Thus, the play in a ratchet wrench is minimized and counter-rotation used to ratchet the tool has a minimal amount of wasted motion.

In a preferred embodiment, the ratchet tool is a reversible dual-pawl wrench having a first bias member of the bias assembly, a pair of pawls biased apart by the first bias member, and a second bias member of the bias assembly which contacts and engages both of the pawls for providing a radial force thereto. The second bias member is preferably a leaf spring so that packaging space required in a head of the ratchet wrench is minimized. The position of the second bias member is preferably maintained by the pawls and features of the ratchet head so that fasteners or the like are not necessary, thereby minimizing manufacturing and component cost.

In other embodiments, the ratchet tool may be a non-reversible ratchet wrench wherein the tool is connectable to a workpiece in a first orientation for providing drive in a first direction and connectable in a second orientation for providing drive in a second direction that is opposite the first direction.

DETAILED DESCRIPTION

Figure 1:
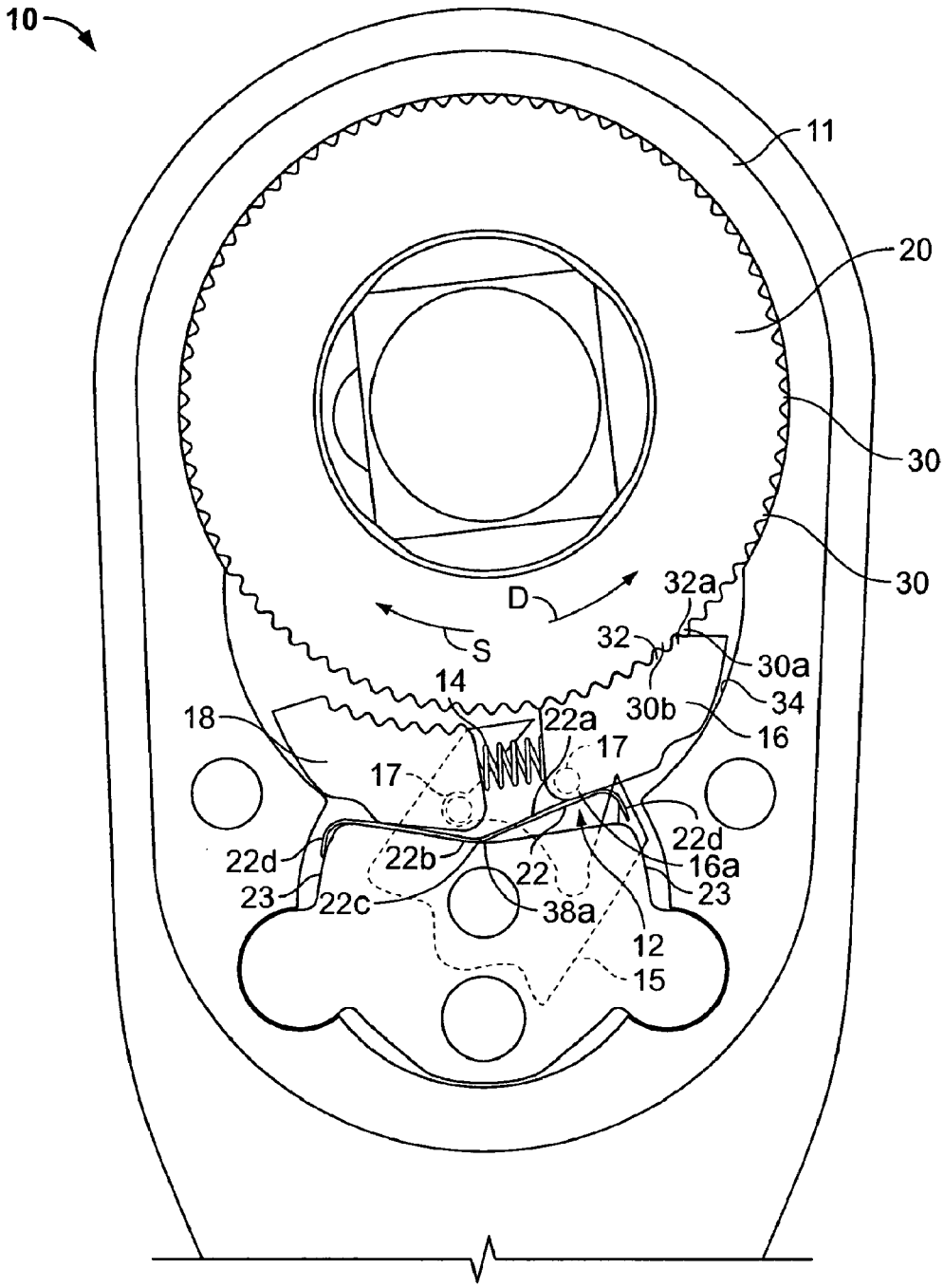
FIG. 1 is a top plan view of a ratchet head of a wrench with a cover plate removed to show the internal components thereof including a first embodiment of a bias assembly and a pawl assembly for minimizing wasted rotational movement of the wrench.

Referring initially to FIG. 1, a ratchet head 10 of a ratchet wrench is shown having a body 11 and a bias assembly 12 for reducing waste rotation when the wrench is rotated and counter-rotated. In the present form, the bias assembly 12 includes a first spring 14, referred to herein as the selection spring 14, for biasing first and second pawls 16, 18 apart. The first and second pawls 16, 18 are selectively engagable with a ratchet gear 20 to select a drive direction and a slip or ratchet direction respectively corresponding to rotation and counter-rotation of the ratchet head 10. The selection spring 14 allows a reversing lever or drive direction selector or actuator 15 to act upon posts 17 of the pawls 16, 18 so that the selector 15 may shift one of the pawls 16, 18 into or out of engagement with the gear 20, and the selector spring 14 serves to shift the other of the pawls 18, 16 in the opposite manner as the one pawl 16, 18. Preferably, the selector 15 is operated to pull one of the pawls 16, 18 out of engagement, such as pawl 18 as illustrated in FIG. 1, by hooking onto the post 17 thereof, and the selector spring 14 biases the second of the pawls, such as pawl 16, into engagement with the gear 20.

As shown, the pawl 16 is engaged with the gear 20 to provide torque through the gear 20 when the ratchet head 10 is rotated in the drive direction D. When the ratchet head 10 is counter-rotated, in a slip direction S opposite the drive direction D, the pawl 16 shifts radially from the gear 20 so that the gear 20 is able to rotate relative to the pawl 16. The bias assembly 12 further includes a second spring 22, referred to herein as the engagement spring 22, that provides a force in the radial direction relative to the gear 20. As depicted in FIG. 1, the engagement spring 22 is generally a form of a leaf spring having first and second portions 22a and 22b that form a slight V-shape.

Figure 2:
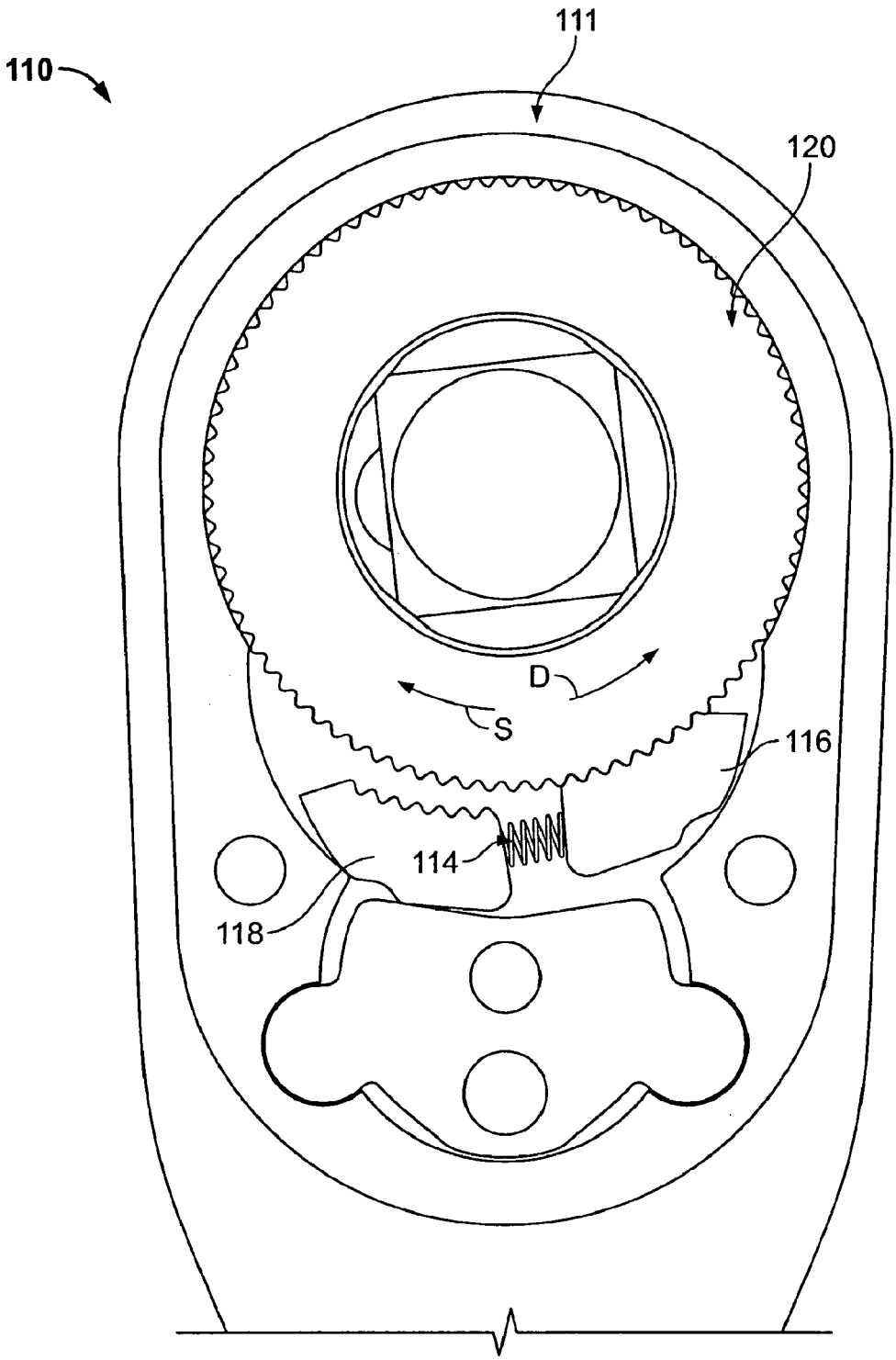
FIG. 2 (Prior Art)
FIG. 2 is a top plan view similar to FIG. 1 of a prior art ratchet head with a first pawl in an engaged position for providing torque drive.
Figure 3:
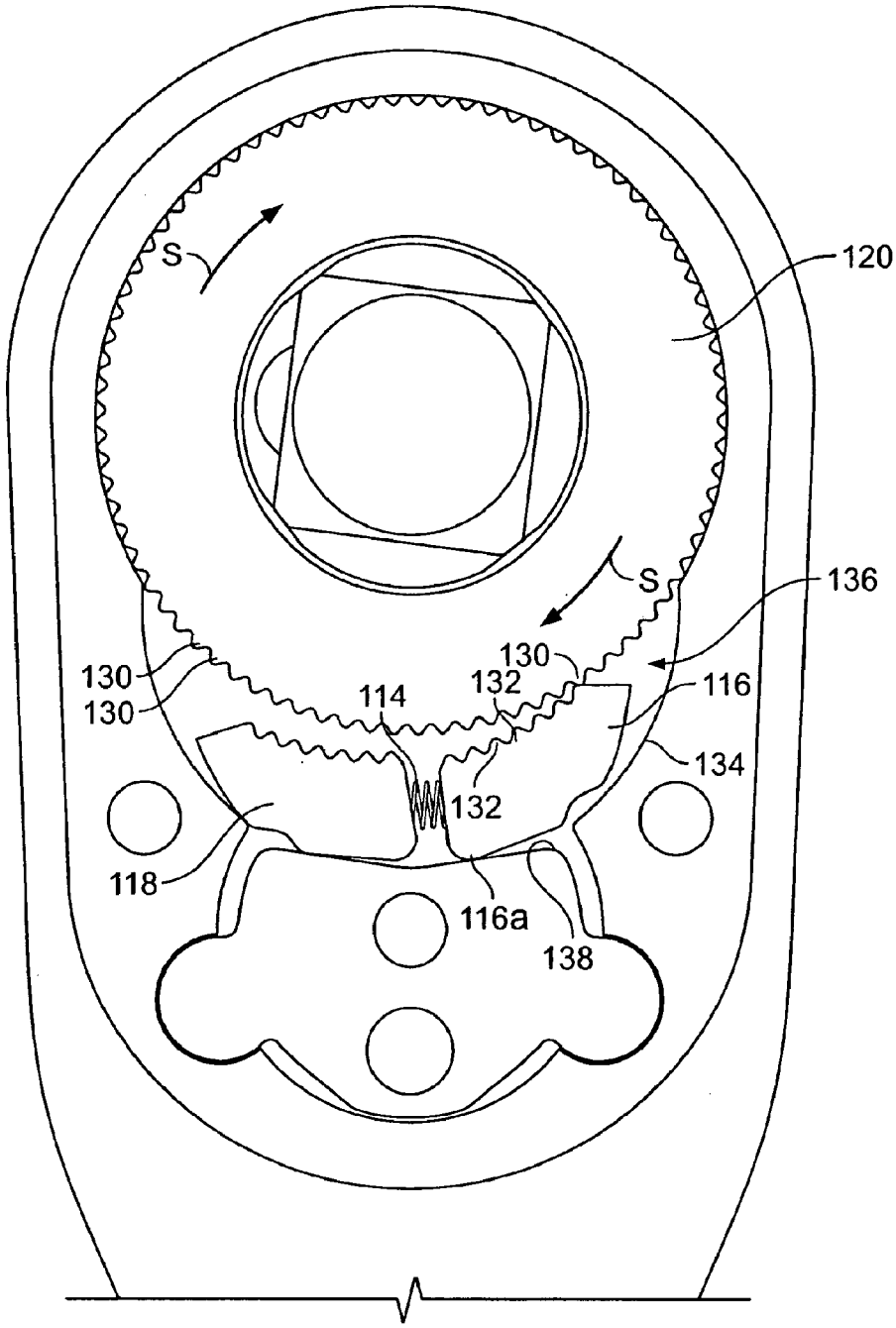
FIG. 3 (Prior Art)
FIG. 3 is a top plan view of the prior ratchet head of FIG. 2 showing the first pawl initially shifted towards a position to allow for slip or ratcheting of the pawl with a ratchet gear due to counter-rotation of the ratchet head.

The function of the engagement spring 22 may be highlighted by reference to a prior art ratchet head 110 lacking the engagement spring 22, as shown in FIGS. 2 and 3. The ratchet head 110 includes ratchet body 111, first and second pawls 116, 118, and a selector spring 114. A selector (see FIG. 1) is utilized to selectively engage the pawls 116, 118 with a ratchet gear 120. In FIG. 2, the pawl 116 is shown engaged with the gear 120 so that rotation of the ratchet head 110 in the drive direction D provides torque drive through the gear 120 to a workpiece.

FIG. 3 illustrates the movement of the pawl 116 when the ratchet head 110 is counter-rotated in the slip direction S. Counter-rotation causes teeth 130 of the gear 120 to cam against teeth 132 of the pawl 116 to force the pawl 116 out of engagement, thereby compressing the selector spring 114. That is, counter-rotation forces the pawl 116 to rotate partially with the gear 120, as well as to shift radially outward toward a wall 134 formed on the ratchet head 110 within the cavity 136 in which the components are located.

When the counter-rotation initially begins, the pawl 116 simply rotates to the position shown in FIG. 3. In the shown form of the ratchet head 110, the pawl 116 rotates until a rear portion 116a comes into contact with a fixed structure of the ratchet head, such as wall 138. Were the ratchet tool released at this point, the bias of the selector spring 114 would cause the gear 120 and pawl 116 to return to the position shown in FIG. 2, though such would not provide torque drive to the workpiece. Counter-rotation beyond that shown in FIG. 3 is required in order for the teeth 132 of the pawl 116 to click, slip, or ratchet over the teeth 130 of the gear 120, which is necessary for the desired ratchet action of the tool. The relative rotational movement between the position shown in FIG. 2 and the position FIG. 3 essentially allows for no ratcheting, nor any torque drive; it is this movement that is referred to as play, and this movement is wasted motion. As shown, this wasted motion may be 13 degrees rotation or more. As described above, for use of a ratchet tool in an environment that allows only a relatively small angular sweep, such wasted motion can be significant.

The ratchet head 10 of FIG. 1 reduces or eliminates such wasted motion. Broadly speaking, a ratchet tool would require a minimum of counter-rotation in order to have a pawl ratchet over the ratchet gear. For a toothed pawl and a toothed gear, the amount of counter-rotation required is that which causes a specific tooth of the pawl received between first and second adjacent teeth of the ratchet gear to shift out from between the adjacent teeth, and shift to a position between the second tooth and a third tooth. In an arrangement ideal for minimizing play, the counter-rotation required for a pawl tooth to ratchet over a single gear tooth is the angular length of one of the teeth. In such an arrangement, the pawl would move radially outward, and only radially outward, from the ratchet gear when counter-rotation occurs.

While such would minimize play, such an arrangement would not be ideal for operation of the entire ratchet tool assembly as a whole. As can be seen from the FIG. 1, it is common for drive rotation to press the engaged pawl 16 against the wall 34 or, more specifically, to compress the pawl 16 between the wall 34 and the gear 20. This allows increased torque applied to the tool to increase the pressure and, hence, gripping between the teeth of the pawl 16 and gear 20. In order to construct a ratchet assembly that minimizes play as described above, the wall 34 would have to be eliminated so that a pawl would move only radially. While some prior art devices have attempted geometries that allow the pawl to move only radially, these require a guide channel that the sides of the pawl slide within. This causes excessive wear and can cause binding of the pawl with the walls, effectively ruining the tool itself. It further requires a selector that can move both pawls simultaneously, and requires a large ratchet head.

The dual-pawl mechanism of the ratchet 10 both minimizes play for counter-rotation and uses the wall 34 as described. By using the engagement spring 22 and the selector spring 14, the pawl 16 is maintained in a relative orientation to the ratchet gear so that the arc of the pawl teeth 32 remains concentric with the gear 20 and with the arc of the gear teeth 30, thereby preventing the initial pawl rotation described in reference to FIG. 3. During counter-rotation, the gear teeth 30 cause the pawl 16 to cam out of engagement, and the selector spring 14 and engagement spring 22 initially compress. Once the pawl teeth 32 are fully cammed out of engagement with the gear teeth 30, the selector spring 14 expands to advance the pawl 16 so that the pawl 16 moves in a direction opposite the counter-rotating gear 20. The engagement spring 22 prevents the pawl rotation shown in FIG. 3 by biasing the rear portion 16a towards the gear 20. Thus, a leading tooth 32a on the pawl 16 more readily cams away from adjacent gear teeth 30a, 30b. Accordingly, the bias assembly 12 comprising the engagement spring 22 and selector spring 14 serves to minimize the play in the ratchet head 10 during counter-rotation.

As noted above, FIG. 1 shows the engagement spring 22 in the form of a leaf spring having first and second portions 22a, 22b in a V-shape so that there is an apex 22c therebetween. While the ratchet head 10 has been described with the pawl 16 engaged, the ratchet head 10 is reversible so that the drive direction D and slip direction S can be reversed upon selection and engagement with the ratchet gear of the second pawl 18. The first portion 22a contacts and is engageable with the first pawl 16 while the second portion 22b contacts and is engageable with the second pawl 18 so that the engagement spring 22 biases the selected pawl 16, 18 into the desired orientation relative to the gear 20, as described. In FIG. 1, the pawl 18 is retracted from the gear 20 so that it presses against the second portion 22b which in turn presses against the wall 38. Movement of the second pawl 18 towards the wall 38 rocks or pivots the engagement spring 22 against its apex 22c so that the first portion 22a is pressed away from the wall 38, thereby increasing the bias applied against the first pawl 16. Preferably, the wall 38 is also somewhat V-shaped or arcuate so that there is a wall apex 38a into which the engagement spring apex 22c is generally received and positioned. The leaf spring geometry for the engagement spring 22 minimizes packaging space by minimizing the space required in the ratchet head cavity 36 to accommodate the engagement spring 22 and other components. This geometry further allows a single engagement spring 22 to be used, and allows the engagement spring 22 to be used as described while only requiring a selector or reversing lever 15 to act upon one of the pawls 16, 18.

It should be noted that the engagement spring 22 of FIG. 1 further includes ends 22d that are curved and angled away from the pawls 16, 18. The engagement spring 22 is sized so that these ends 22d alternately, depending on the selected pawl 16, 18, hook on to an interior portion of the ratchet head 10, such as the edges 23. The engagement spring 22 is retained by the ends 22d so that the engagement spring 22 is maintained in the proper location and does not slip within the ratchet head 10, a function further promoted by the cooperation of the wall apex 38a and the engagement spring apex 22c.

Figure 4:
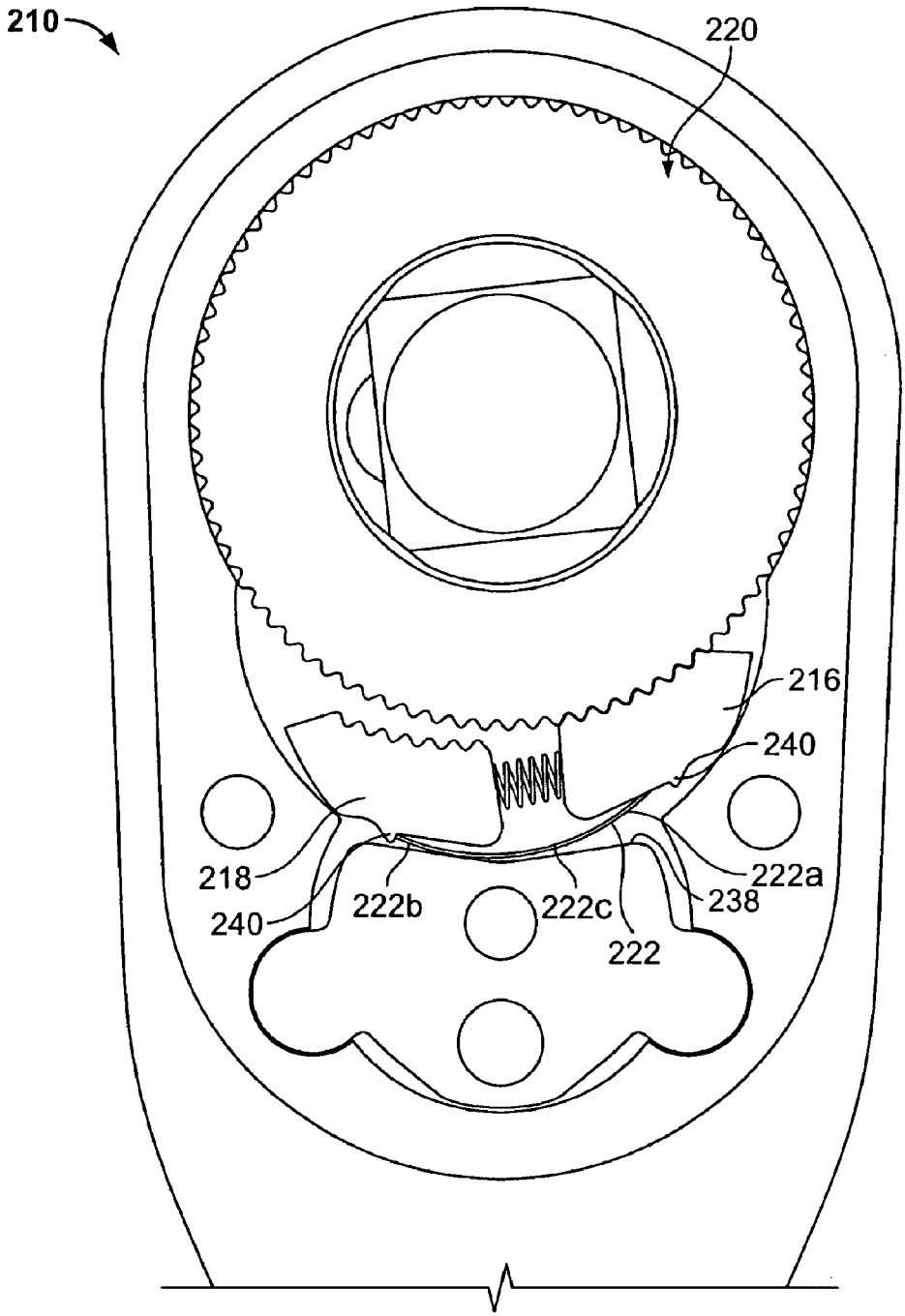
FIG. 4 is a top plan view similar to FIG. 1 showing a second embodiment of a bias assembly.

A second form of an engagement spring 222 is shown in a ratchet head 210 in FIG. 4. The ratchet head 210 and engagement spring 222 operate in substantially the same manner as the ratchet head 10 and engagement spring 22 of FIG. 1. The engagement spring 222 is simply an arcuate leaf spring member positioned with a central portion 222c generally abutting a wall 238, with a first end 222a positioned against a first pawl 216, and with a second end 222b positioned against a second pawl 218. In comparison with the engagement spring 22, this engagement spring 222 eliminates the arced ends 22b, instead utilizing structural features formed on each of the pawls 216, 218, such as short barbs 240, to retain the engagement spring 222 in position within the ratchet head 210. For the ratchet head 10, it can be seen that engagement and retraction of the pawls 16, 18 cause the pawls 16, 18 to slide along the engagement spring 22, while for the ratchet head 210 the engagement spring 222 moves to some degree with the pawls 216, 218 and slides along the wall 238, and to some degree moves relative to the pawls 216, 218 as well. That is, when the first pawl 216 is pulled out of engagement with the gear 220, the first engagement spring end 222a slides along pawl 216 until the barb 240 comes into contact therewith. The engagement spring 222 then slides along the wall 238 with continued movement of the first pawl 216. During either or both of these stages, the engagement spring 222 may also rock or rotate with respect to the wall 238.

It should be recognized that other forms and geometries for the engagement spring 22 are possible, as well as a pair of engagement springs 22 may be used. Further, it should be noted that the preferred embodiment minimizes packaging space and manufacturing steps, though larger springs or coil springs may be used for the engagement spring, and that the engagement spring may be fastened directly to the pawls and/or a fixed structure in the ratchet head such as the wall 38. It should also be noted that the bias assembly 12 providing bias in two directions may be formed from a single bias member.

Furthermore, it should be recognized that the operation of the bias assemblies described herein may be employed with a non-reversible wrench. Essentially, a non-reversible wrench is engageable with a workpiece in a first orientation to produce drive in a first rotational direction relative to the workpiece and is engageable with the workpiece in a second orientation to produce drive in a second rotation direction relative, to the workpiece, that is opposite the first rotational direction. Typically, such a device would have a ratchet gear similar to gear 20, though usually having a recess or mirrored structure on two opposite sides for engaging the workpiece. When viewed relative to the wrench itself, the head allows for drive in one rotational direction and slip in the other rotational direction. Accordingly, such a wrench typically has a single pawl. Nevertheless, a prior art wrench of this kind would also provide bias in a single direction to the pawl.

In accordance with an aspect of the present invention, a bias assembly is provided that provides bias in two directions to a single pawl like that which would be used in a non-reversible ratchet tool. That is, the ratchet head 10 shown in FIG. 1 may be modified so that the second pawl 18 is omitted, the selection spring 14 and engagement spring 22 act to bias the first pawl 16 towards the engaged position with the gear 20. Upon counter-rotation in the slip direction S, the operation of the bias assembly 12 (in the present form comprising the selection spring 14 and engagement springs 22), the rotation of the pawl 16 that otherwise results in play or wasted motion is reduced or eliminated.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A bias assembly in combination with a reversible ratchet tool having first and second pawls and a reversing actuator for selecting a drive direction for the ratchet tool by selectively engaging one of the pawls into a ratchet gear, the bias assembly comprising:

a first bias member having, a first portion engageable with the first pawl, a second portion engageable with the second pawl, and a third portion engageable with a portion of the ratchet tool, and a spring bias member disposed between and engaged with the first and second pawls and providing a spring bias force to separate the pawls, wherein the first bias member provides a first spring bias force in a radially inward direction towards the ratchet gear, and the first spring bias force biases the selected pawl towards the ratchet gear and biases the selectively engaged pawl towards concentric alignment with the ratchet gear to maintain the selected pawl in concentric alignment during counter-rotation.

2. The combination of claim 1 wherein the first bias member is a leaf spring.

3. The combination of claim 1 wherein the first bias member is generally V-shaped, the third portion thereof being an apex of the V-shape, and the apex is generally positioned against a V-shape formed on the ratchet tool.

4. The combination of claim 3 wherein the first bias member pivots on the apex in response to shifting of the pawls due to selection of a drive direction.

5. The combination of claim 1 wherein the first bias member further includes first and second ends, the first and second ends engageable with a portion of the ratchet tool to position the first bias member in the ratchet tool.

6. The combination of claim 1 wherein the first bias member is generally arcuate.

7. The combination of claim 6 wherein the first bias member includes first and second ends, the first and second ends respectively including the first and second portions engageable with the first and second pawls.

8. The combination of claim 6 wherein the first and second portions of the first bias member are cooperable with structural features of the first and second pawls to position the first bias member in the ratchet tool.

9. A bias assembly in combination with a reversible ratchet tool having first and second pawls and a reversing actuator for selecting a drive direction for the ratchet tool by selectively engaging one of the pawls into a ratchet gear, the bias assembly comprising:

a first engagement contact for spring biasing the first pawl towards the ratchet gear;

a second engagement contact for spring biasing the second pawl towards the ratchet gear; and third and fourth engagement contacts for spring biasing the first and second pawls apart, wherein the bias assembly spring biases the selectively engaged pawl towards concentric alignment with the ratchet gear to maintain the selected pawl in concentric alignment during counter-rotation.

10. The combination of claim 9 wherein the first and second engagement contacts are formed on a bias member for providing a spring bias force against the first and second pawls to direct at least the selectively engaged pawl towards the ratchet gear in a radial direction thereof.

11. The combination of claim 10 wherein the third and fourth engagement contacts are formed on an additional bias member positioned between the first and second pawls.

12. The combination of claim 10 wherein the bias member is a leaf spring.

13. The combination of claim 9 wherein the bias assembly provides spring bias to both pawls simultaneously.

14. A reversible dual-pawl ratchet wrench comprising:

a ratchet head having walls defining a cavity for receiving components for selecting a drive direction of the ratchet wrench;

a ratchet gear at least partially received within the cavity for transmitting torque to a workpiece;

first and second pawls selectively engageable with the ratchet gear for the selected drive direction of the ratchet wrench; and a bias assembly cooperating with the first and second pawls and with the ratchet head walls to spring bias in a radially inward direction at least the selectively engaged pawl into concentric alignment with the ratchet gear, the bias assembly further cooperating with the first and second pawls to spring bias the pawls apart to maintain the selected pawl in concentric alignment during counter-rotation.

15. The ratchet wrench of claim 14 wherein the bias assembly includes a first bias member in the form of a leaf spring for spring biasing the selectively engaged pawl into concentric alignment with the ratchet gear, and a second bias member for biasing the first and second pawls apart.

16. The ratchet wrench of claim 15 wherein the second bias member is a coil spring.

17. The ratchet wrench of claim 15 further including a reversing actuator for selecting the drive direction, the reversing actuator alternately engageable with the pawls for shifting one pawl, wherein the second bias member cooperates with the shifted pawl to shift the other pawl.

18. The ratchet wrench of claim 14 further including a reversing actuator for selecting the drive direction, the reversing actuator alternately engageable with the pawls to shift one pawl out of engagement with the ratchet gear, the bias assembly biasing the other pawl away from the shifted pawl and into engagement with the ratchet gear.

19. The ratchet wrench of claim 18 wherein the bias assembly includes a bias member for spring biasing the each of the pawls towards concentric alignment with the ratchet gear when the pawls are selected, and the bias member is shifted within the cavity in response to selection of a drive direction.

20. The ratchet wrench of claim 19 wherein the bias member provides a spring bias force against the first and second pawls to direct at least the selectively engaged pawl towards the ratchet gear in a radial direction thereof.

*21. An assembly for a reversible ratchet tool, the assembly comprising:*

*first and second pawls selectively engageable with a ratchet gear disposed in the ratchet tool;*

*a selector adapted to cooperatively engage the first and second pawls and cause a selected one of the first and second pawls to engage the ratchet gear and thereby select a drive direction;*

*a first bias member adapted to provide a first bias force in a radially inward direction towards the ratchet gear to maintain the selected one of the first and second pawls in substantial concentric alignment with the ratchet gear; and*

*a second bias member adapted to bias the first and second pawls apart from one another independent of the drive direction selected by the selector.*

*22. The assembly of claim 21 wherein the first bias member is a leaf spring.*

*23. The assembly of claim 21 wherein the first bias member is generally V-shaped and has an apex and two extending members, and wherein the apex is generally positioned against a V-shaped structure of the ratchet tool.*

*24. The assembly of claim 23 wherein the first bias member is adapted to pivot on the apex in response to movement of the selector.*

*25. The assembly of claim 23 wherein the first bias member further includes first and second ends, the first and second ends being engageable with a portion of the ratchet tool to position the first bias member in the ratchet tool.*

*26. The assembly of claim 21 wherein the first bias member is generally arcuate and includes first and second ends that are adapted to respectively abut the first and second pawls.*

*27. The assembly of claim 26 wherein the first bias member includes first and second ends respectively engageable with the first and second pawls.*

*28. The assembly of claim 26 wherein the first and second ends of the first bias member are adapted to respectively cooperate with structural features of the first and second pawls.*

*29. The assembly of claim 21, wherein the second bias member is disposed between and coupled to the first and second pawls.*

*30. The assembly of claim 21, wherein the first bias member includes a first portion about which the first bias member pivots, a second portion adapted to abut the first pawl, and a third portion adapted to abut the second pawl.*

*31. The assembly of claim 21, wherein the first and second pawls respectively include first and second posts and the selector is adapted to engage the first post to cause the second pawl to engage the ratchet gear, and is adapted to engage the second post to cause the first pawl to engage the ratchet gear.*

*32. A bias assembly adapted to cooperate with a reversible ratchet tool having first and second pawls and a reversing actuator for selecting a drive direction by engaging a selected one of the first and second pawls, the bias assembly comprising:*

*a first contact adapted to bias the first pawl towards the ratchet gear when the reversing lever is actuated in a first direction thereby disposing the selected pawl in substantial concentric alignment with the ratchet gear;*

*a second contact adapted to bias the second pawl towards the ratchet gear when the reversing lever is actuated in a second direction thereby disposing the selected pawl in substantial concentric alignment with the ratchet gear; and*

*a spring adapted to provide a spring bias force to bias the first and second pawls apart from one another.*

*33. The bias assembly of claim 32 wherein the first and second contacts are formed on a bias member that is adapted to provide a spring bias force against the first and second pawls to direct at least the selected one of the first and second pawls towards the ratchet gear in a radial direction.*

*34. The bias assembly of claim 33 wherein the spring is disposed between the first and second pawls.*

*35. The bias assembly of claim 33 wherein the bias member is a leaf spring.*

*36. The bias assembly of claim 32 wherein the first and second contacts are adapted to simultaneously provide the spring bias force to the first and second pawls.*

*37. A reversible ratcheting tool comprising:*

*a ratchet gear adapted to transmit torque to a workpiece;*

*first and second pawls selectively engageable with the ratchet gear; and*

*a bias assembly adapted to provide a spring bias force, in a radially inward direction relative to the ratchet gear, thereby causing at least one of the first and second pawls to engage the ratchet gear in substantial concentric alignment, the bias assembly including:*

*a selector adapted to engage the first and second pawls and thereby select a drive direction;*

*a first bias member adapted to provide a first bias force in a radially inward direction towards the ratchet gear to maintain the at least one of the first and second pawls in substantial concentric alignment with the ratchet gear; and*

*a second bias member adapted to bias the first and second pawls apart from one another independent of the drive direction.*

*38. The tool of claim 37 wherein the second bias member is a coil spring.*

*39. The tool of claim 37 wherein the bias assembly is adapted to cooperate with the first pawl to shift the second pawl relative to the ratchet gear.*

*40. The tool of claim 37 wherein the selector is adapted to shift the first pawl out of engagement with the ratchet gear, and wherein the bias assembly is adapted to bias the second pawl away from the first pawl and into engagement with the ratchet gear.*

*41. The tool of claim 40 further comprising a ratchet head having walls defining a cavity for at least partially receiving the bias assembly, wherein the first bias member is adapted to shift within the cavity in response to selection of the drive direction.*

* * * * *